(12) United States Patent
Whitling et al.

(10) Patent No.: US 8,007,196 B2
(45) Date of Patent: Aug. 30, 2011

(54) SMALL HANDLING POLE LOCKING ASSEMBLY

(75) Inventors: Robert Whitling, Morgan Hill, CA (US); Gregory Francisco, Glencoe, CA (US); William Dale Jones, Phoenix, AZ (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 154 days.

(21) Appl. No.: 12/056,738

(22) Filed: Mar. 27, 2008

(65) Prior Publication Data

US 2009/0245924 A1   Oct. 1, 2009

(51) Int. Cl.
*F16B 7/10*   (2006.01)

(52) U.S. Cl. .................. 403/109.1; 403/166; 403/304; 403/353; 403/378

(58) Field of Classification Search ....... 403/108–109.4, 403/109.6–109.8, 286, 287, 291–293, 296, 403/299, 300, 304, 307, 324–327, 353, 359.3, 403/359.4, 378–379.2, DIG. 4, 166
See application file for complete search history.

(56) References Cited

U.S. PATENT DOCUMENTS

| | | | | |
|---|---|---|---|---|
| 2,032,196 A | * | 2/1936 | Blake | 403/325 |
| 2,328,988 A | * | 9/1943 | Martin | 403/318 |
| 2,448,548 A | * | 9/1948 | Purdy | 403/341 |
| 2,527,256 A | * | 10/1950 | Jackson | 403/319 |
| 2,690,542 A | * | 9/1954 | Pearce et al. | 403/327 |
| 3,721,032 A | * | 3/1973 | Shum et al. | 42/106 |
| 3,945,744 A | * | 3/1976 | Metz | 403/317 |
| 4,943,182 A | * | 7/1990 | Hoblingre | 403/325 |
| 5,002,418 A | * | 3/1991 | McCown et al. | 403/353 |
| 6,007,268 A | * | 12/1999 | Whittington et al. | 403/328 |
| 6,126,359 A | * | 10/2000 | Dittrich et al. | 403/353 |

\* cited by examiner

*Primary Examiner* — Victor MacArthur

(74) *Attorney, Agent, or Firm* — Harness, Dickey & Pierce, P.L.C.

(57) ABSTRACT

In various embodiments, the system includes a tubular female end portion of the first pole section and a male end portion of the second pole section that is insertable into the female end portion. Additionally, the system includes a locking nut including a body portion and a neck portion and is threadingly engaged with the male end portion. Furthermore, the system includes a biased locking sleeve assembly that includes a locking sleeve having an internal cavity such that the locking sleeve fits over the locking nut neck portion, and a biasing device located within the interior cavity of the locking sleeve for applying opposing forces to the locking nut and the locking sleeve.

9 Claims, 5 Drawing Sheets

SMALL HANDLING POLE LOCKING ASSEMBLY

CROSS-REFERENCE TO RELATED APPLICATIONS

The present application is related in general subject matter to the following application, which is being filed concurrently with the present application, and is hereby incorporated by reference into the present application in its entirety, U.S. application Ser. No. 12/056,711.

FIELD

The present teachings relate to systems and methods for securely connecting, or interlocking, two pole sections together such that they do not disconnect during use.

BACKGROUND

The statements in this section merely provide background information related to the present disclosure and may not constitute prior art.

Various industries incorporate the use of long poles to perform various operational, manufacturing, organizational, inspection and maintenance tasks. For convenience and flexibility, such poles are often constructed, or assembled, by connecting various length pole sections together to provide a pole of a specific length. Additionally, a tool or some other instrument or device is often connected to an end of the assembled pole to perform a desired task. In many instances the interconnection of the pole sections, and the interconnection of the tool and respective pole section, can incur substantial stress, vibration, shaking and/or rotational torque during use. Accordingly, it can be important that the interconnections be very secure to prevent loosening and/or separating of the sections and/or tool during use.

For example, high torque, sectional handling poles are often used by nuclear reactor service technicians to manipulate tools utilized for performing various service, inspection and repair tasks inside the reactor vessel. Frequently, during manipulation of the pole and tool within the reactor vessel, particularly when the technician applies a rotational torque to the pole, one or more coupling assemblies used to connect the pole sections and tool together loosen and often separate. When such separation of the pole sections and/or tool occur, the activities must be interrupted until the section or tool is retrieved.

SUMMARY

In various embodiments, a system for interlocking a first pole section to a second pole section is provided, wherein the system includes a tubular female end portion of the first pole section and a male end portion of the second pole section that is insertable into the female end portion. Additionally, the system includes a locking nut including a body portion and a neck portion extending from the body portion, the locking nut threadingly engaged with the male end portion and rotatable to longitudinally transition the locking nut into contact with the female end portion. Furthermore, the system includes a biased locking sleeve assembly slidably and rotatably mounted on a locking assembly portion of the second pole. The locking sleeve assembly includes a locking sleeve including an internal cavity having an inside diameter substantially equal to the outside diameter of the locking nut neck portion such that the locking sleeve fits over the locking nut neck portion, and a biasing device located within the interior cavity of the locking sleeve for applying opposing forces to the locking nut and the locking sleeve.

In various other embodiments, a system for interlocking a first pole section to a second pole section is provided, wherein the system can include a tubular female end portion of the first pole section. The tubular female end portion includes a pair of opposing substantially J-shaped connecting slots, each having a backbone section open at a distal end of the female end portion. The system can additionally include a male end portion of the second pole section that has a connecting pin extending therethrough. The male end portion is insertable into the female end portion such that opposing ends of the connecting pin are inserted into the backbone sections of the connecting slots and are radially transitionable to a hook section of the respective connecting slots. The system can further yet include a locking nut threadingly engaged with the male end portion at a proximal end of the male end portion. the locking nut can include a body portion and a neck portion extending from the body portion and having a smaller outside diameter than the body portion. The locking nut is rotatable to longitudinally transition the locking nut body portion into contact with the female end portion such that the connecting pin ends are moved into the hook sections of the connecting slots to fixedly interlock the male end portion with the female end portions.

The system can still further include a locking sleeve retaining pin extending through a locking sleeve assembly portion of the second pole between the locking nut and a proximal end of the locking sleeve assembly portion, and a biased locking sleeve assembly. The locking sleeve assembly is slidably and rotatably mounted on the locking sleeve assembly portion between the locking nut and the locking sleeve retaining pin. In various implementations, the locking sleeve assembly can include a locking sleeve and a biasing device. In various forms the locking sleeve can include an internal collar having an inside diameter substantially equal to an outside diameter of the locking assembly portion of the second pole section, and an internal cavity having an inside diameter substantially equal to the outside diameter of the locking nut neck portion such that the locking sleeve fits over the locking nut neck portion. The biasing device is located within the interior cavity of the locking sleeve for applying opposing forces to the locking nut and the locking sleeve.

In various other embodiments, a method for interlocking a first pole section to a second pole section is provided, wherein the method includes inserting a tubular female end portion of the first pole section over a male end portion of the second pole section such that opposing ends of a connecting pin extending through the male end portion are inserted into backbone sections of opposing J-shaped connecting slots formed in the female end portion. The method can additionally include rotating at least one of the male and female end portions relative to each other to radially transitioning the connecting pin ends to hook sections of the respective connecting slots. Furthermore, the method can include rotating a locking nut threadingly engaged with the male end portion at a proximal end of the male end portion to longitudinally transition a body portion of the locking nut into contact with the female end portion, thereby moving the connecting pin ends into the hook sections to fixedly interlock the male end portion with the female end portions.

Still further, the method can include rotating a biased locking sleeve fitted over and lockingly engaged with a neck portion of the locking nut to disengage the locking sleeve from the locking nut neck portion. Still further yet, the method can include utilizing a biasing device located within an interior cavity of the locking sleeve to apply a force to the locking sleeve and longitudinally transition the locking sleeve along the locking nut neck portion to place the locking sleeve in a locked position where rotation of the locking sleeve and the locking nut about the male end portion is prohibited or considerably inhibited to prevent disengagement of the male and female end portions.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1A is an illustration of the handling pole shown in FIG. 1 having the adjacent pole sections separated, in accordance with various embodiments of the present disclosure.

DETAILED DESCRIPTION

Figure 1:
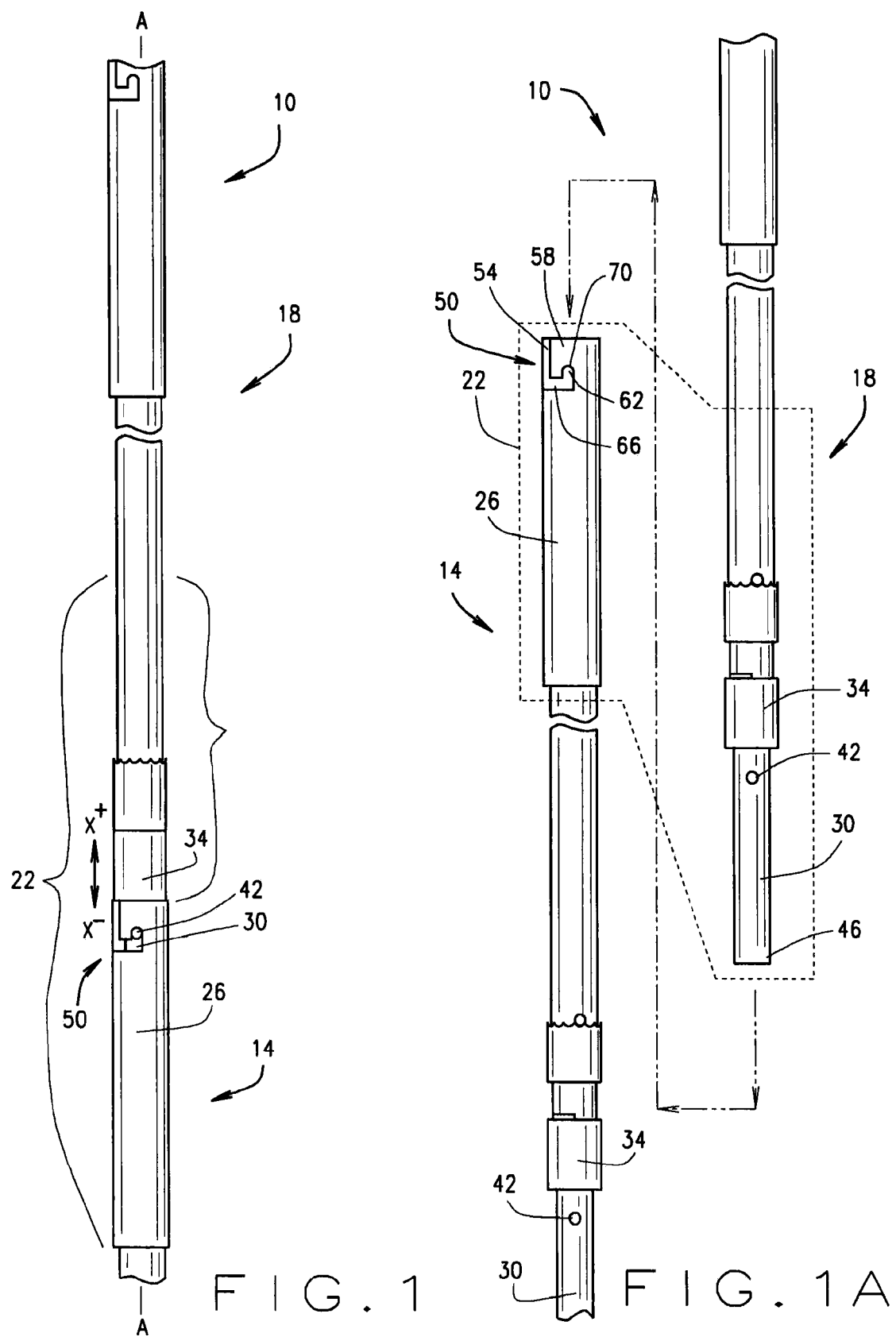
FIG. 1 is an illustration of a segment of a sectional handling pole including adjacent pole sections interlocked together utilizing a coupling system, in accordance with various embodiments of the present disclosure.

The following description is merely exemplary in nature and is in no way intended to limit the present teachings, application, or uses. Throughout this specification, like reference numerals will be used to refer to like elements.

Referring to FIGS. 1 and 1A, an exemplary illustration of a sectional handling pole 10 is provided. The handling pole 10 can be implemented to perform various operational, manufacturing, organizational, inspection and maintenance tasks where it is inconvenient or unfeasible for the task to be performed by a person in close proximity to the equipment, system, apparatus, device, component, etc., on which the task is to be preformed. For example, in various embodiments, the sectional handling pole 10 can be utilized by nuclear reactor service technicians to manipulate tools used for performing various service, inspection and repair tasks inside the reactor vessel.

Generally, the handling pole 10 includes a first pole section 14 coupled together with a second pole section 18 utilizing a coupling system 22. The first and second pole sections 14 and 18 are generally the same in that they each comprise the same parts, components and structure, as described below. However, the first and second pole sections 14 and 18 are merely exemplary illustrations of two of a plurality of substantially similar pole sections that can be coupled together to construct, or assemble, the handling pole 10. That is, it should be understood that the first and second pole sections 14 and 18 can be of the same or different lengths, and that the handling pole 10 can comprise more pole sections than the first and second pole sections 14 and 18 exemplarily illustrated. Thus, the handling pole 10 can be constructed, or assembled, to have any desired length by coupling together two or more pole sections of desired lengths, e.g., first and second pole sections 14 and 18, using the coupling system 22, as described herein.

Figure 2:
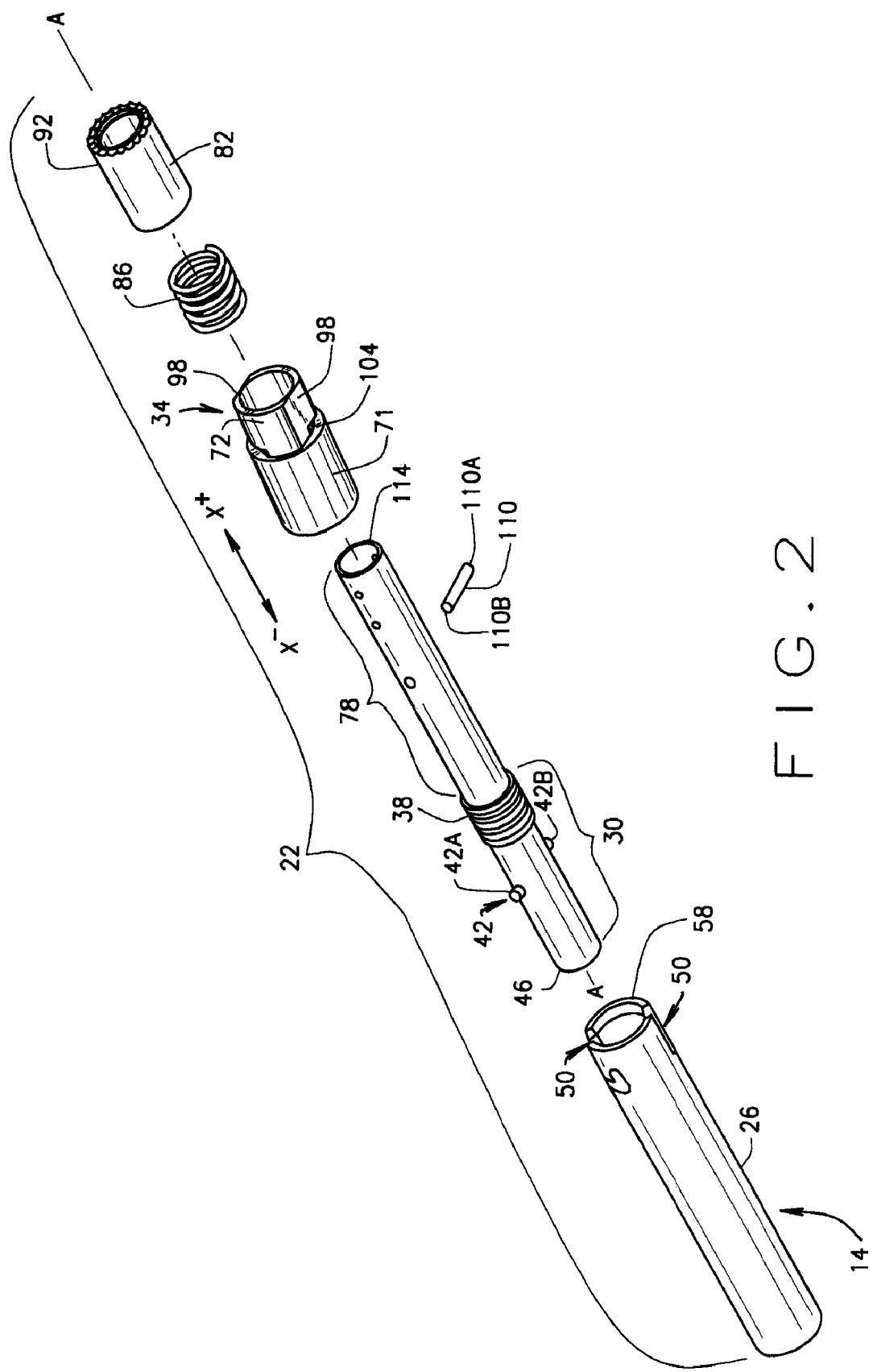
FIG. 2 is an exploded view of the handling pole shown in FIG. 1, in accordance with various embodiments of the present disclosure.

Referring now to FIGS. 1, 1A and 2, in various embodiments, the coupling system 22 includes a tubular female end portion 26 of the first pole section 14 and a male end portion 30 of the second pole section 18. An inner diameter of the tubular female end portion 26 is sized to be substantially equal to an outer diameter of the male end portion 30. Therefore, the male end portion 30 can be inserted into the female end portion 26 with very little play, slop, gap or space between male end portion outer diameter and the female end portion inner diameter. Accordingly, the male end portion 30 fits snuggly within the female end portion 26 such that the first and second pole sections 14 and 18 become a substantially steady, or stable, extension of each other.

Figure 4A:
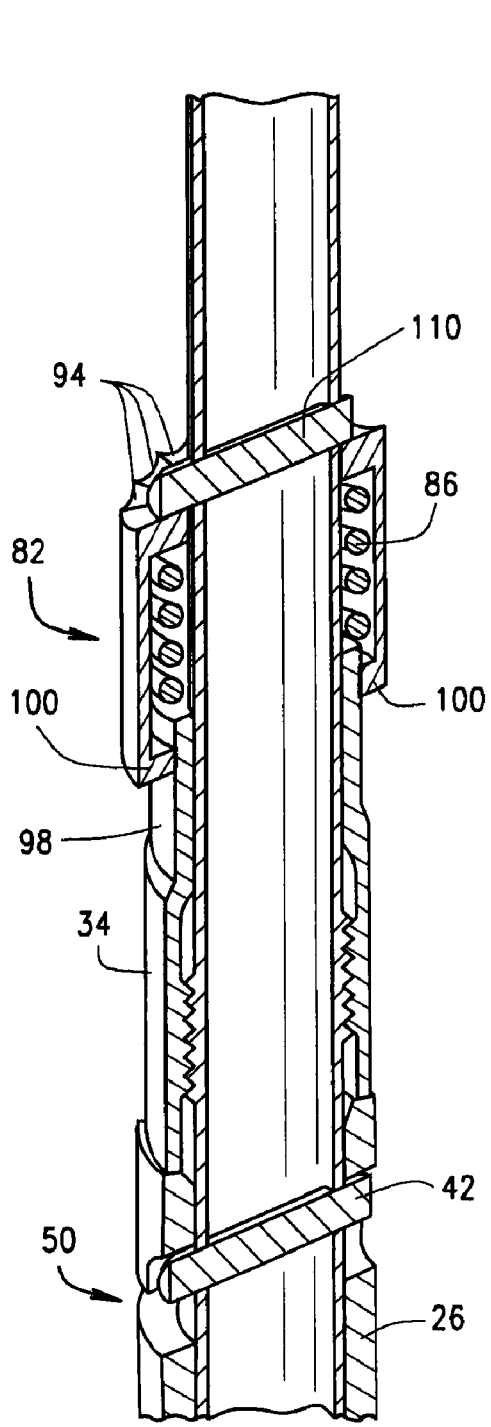
FIG. 4A is a sectional view of a portion of the sectional handling pole shown in FIG. 1, illustrating the locking sleeve assembly shown in FIG. 3 in a 'Locked' position, in accordance with various embodiments of the present disclosure.

Additionally, in various forms, the coupling system 22 includes a locking nut 34 threadingly engaged with threads 38 formed on the male end portion 30. The locking nut 34 can be rotated about the male end portion 30 to longitudinally transition the locking nut 34 along an axis A of the male end portion 30 in the $X^+$ and $X^-$ directions. For instance, once the male end portion 30 is inserted into the female end portion 36, the locking nut 34 can be rotated to longitudinally transition the locking nut 34 in the $X^-$ direction and into contact with the female end portion 26 (as shown in FIG. 4A) to fixedly couple the male end portion 30 with the female end portion 26.

More particularly, in various embodiments, the male end portion 30 includes a connecting pin 42 that extends laterally through male end portion 30 between the threads 38 and a distal end 46 of the male end portion 30. Additionally, the female end portion 26 includes a pair of opposing substantially J-shaped connecting slots 50. As best shown in FIG. 1A, each of the J-shaped connecting slots 50 includes a backbone section 54 that is open at a distal end 58 of the female end portion 26, a hook section 62 and a bottom section 66 that connects the backbone section 54 with the hook section 62. In such embodiments, when the male end portion 30 is inserted into the female end portion 26, opposing ends 42A and 42B are inserted into the backbone section 54 of a respective J-shaped connecting slot 50. The first pole section 14 and/or the second pole section 18 can then be rotated relative to the other to transition the connecting pin ends 42A and 42B from the backbone sections 54 to the hook sections 62, via the bottom sections 66.

The locking nut 34 can then be rotated about the threads 38 to longitudinally transition, or move, the locking nut 34 in the $X^-$ direction and into contact with the distal end 58 of the female end portion 26. Further rotation of the locking nut 34 will move the female end portion 26 in the X⁻ direction drawing the locking pin ends 42A and 42B into the hook sections 62 until the locking pin ends 42A and 42B are drawn firmly and tightly into distal ends 70 of the hook sections 62. When the locking pin ends 42A and 42B are drawn firmly and tightly into distal ends 70 of the hook sections 62, the female and male end portions 26 and 30, and more particularly, the first and second pole sections 14 and 18, are fixedly coupled, or interlocked, together.

Figure 3A:
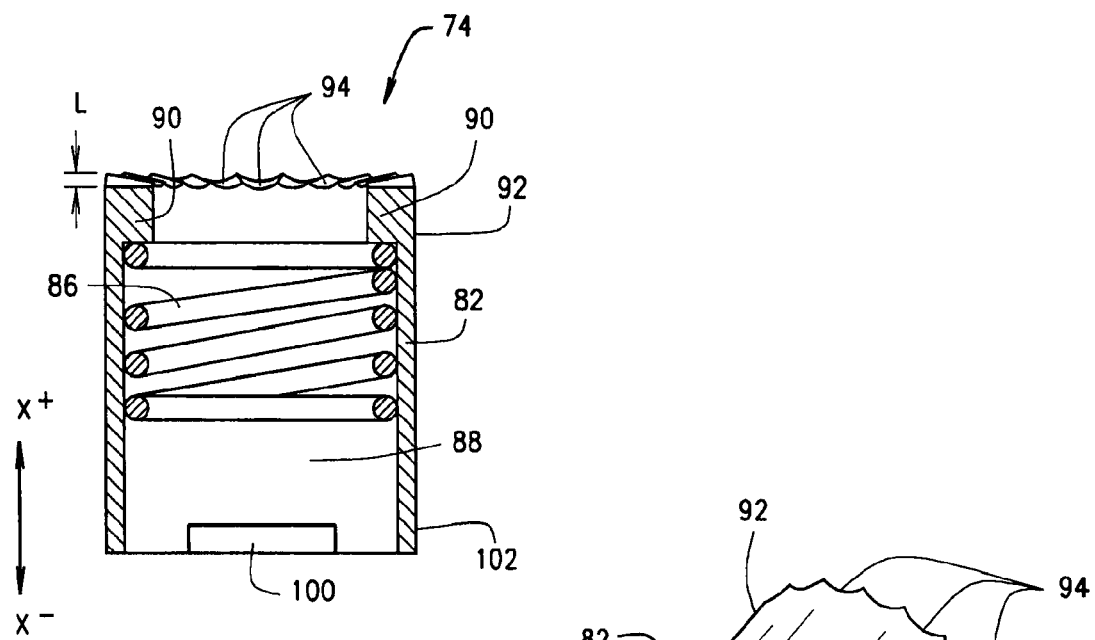
FIG. 3A is a sectional view of a locking sleeve assembly included in the sectional handling pole shown in FIG. 1, in accordance with various embodiments of the present disclosure.
Figure 3B:
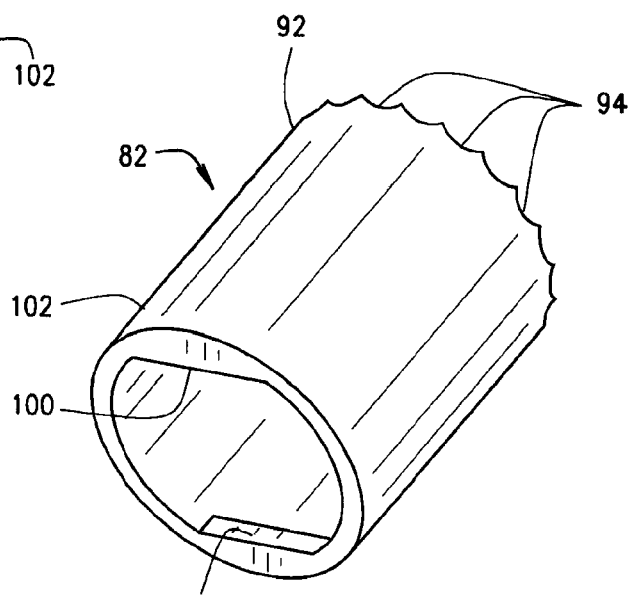
FIG. 3B is an isometric view of a locking sleeve of the locking sleeve assembly shown in FIG. 3A, in accordance with various embodiments of the present disclosure.
Figure 3C:
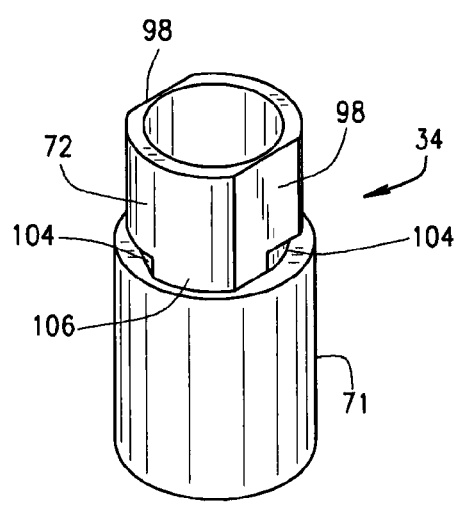
FIG. 3C is an isometric view of a locking nut of the coupling system shown in FIG. 1, in accordance with various embodiments of the present disclosure.

Referring now to FIGS. 2 and 3C, in various embodiments, the locking nut 34 includes a body portion 71 and a neck portion 72 that extends from the body portion 71. The neck portion 72 is formed to have an outside diameter that is smaller than an outside diameter of the body portion 71. As described above, after the connecting pin 42 is positioned in the J-shaped connecting slots 50, the locking nut 34 is rotatable about the threads 38 to longitudinally transition the locking nut 34 in an X⁻ direction and into contact with the female end portion 26. More specifically, as the locking nut 34 is rotated about the threads 38 to move the locking nut 34 in the X⁻ direction, the body portion 71 of the locking nut 34 contacts the female end portion distal end 58 moving the female end portion 26 in the X⁻ direction. Accordingly, the connecting pin ends 42A and 42B are moved into the hook sections 62 of the connecting slots 50 to fixedly interlock the male end portion with the female end portions 30 and 26.

Referring to FIGS. 2, 3A and 3B, in various embodiments, the coupling system 22 further includes a biased locking sleeve assembly 74 that is slidably and rotatably mounted on a locking assembly portion 78 of the second pole 18. In various implementations, the locking sleeve assembly 74 includes a locking sleeve 82 and a biasing device 86 located within an interior cavity 88 of the locking sleeve 82. In various embodiments, the locking sleeve 82 additionally includes an internal collar 90 formed at a distal end 92 of the locking sleeve 82. The internal collar 90 is formed to have an inside diameter that is substantially equal to an outside diameter of the locking assembly portion 78 of the second pole section 18. Additionally, the internal cavity 88 is formed to have an inside diameter substantially equal to the outside diameter of the locking nut neck portion 72 such that the locking sleeve 82 fits over the locking nut neck portion 72. Although illustrated as a spring, the basing device 86 can be any biasing device such as a spring, resilient bushing or any other device suitable for exerting a force on the locking sleeve collar 90 in the X⁺ when the locking sleeve 82 is positioned over the neck portion 72 of the locking nut 34.

Figure 4B:
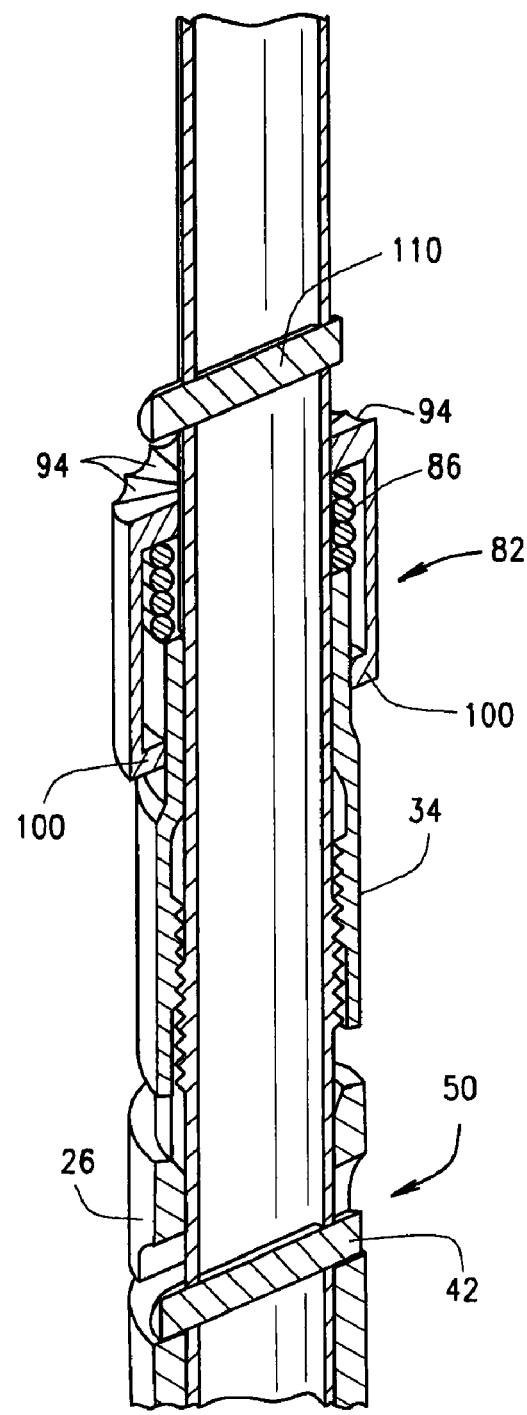
FIG. 4B is a sectional view of a portion of the sectional handling pole shown in FIG. 1, illustrating the locking sleeve assembly shown in FIG. 3 in a 'Unlocked' position, in accordance with various embodiments of the present disclosure.

Referring now to FIGS. 2, 3A, 3B, 3C, 4A and 4B, as described in detail below, the locking sleeve 82 includes a plurality of locking recesses 94 formed along a top edge of the locking sleeve collar 90 at the distal end 92 of the locking sleeve 82. The locking recesses 94 are formed, or structured, to engage a locking sleeve retaining pin 110 extending through the locking sleeve assembly portion 78 between the locking sleeve 82 and a proximal end 114 of the locking sleeve assembly portion 78. Particularly, the locking sleeve assembly 74 is operable such that opposing ends 110A and 110B of the locking sleeve retaining pin 110 are engaged with an opposing pair of the locking recesses 94 to place the locking sleeve assembly 74 in a 'Locked' position (FIG. 4A) and disengaged with the locking recesses 94 when the locking sleeve assembly 74 is placed in an 'Unlocked' position (FIG. 4B).

As best shown in FIG. 3A, the locking recesses 94 are sized to receive the ends 110A and 110B of the locking sleeve retaining pin 110 and have a length L sufficient to securely retain the locking sleeve retaining pin ends 110A and 110B.

More particularly, when the locking sleeve assembly 74 is placed in the 'Locked' position, the biasing force of the biasing device 86 exerted on the locking sleeve collar 90 in the X⁺ direction is sufficient to substantially maintain engagement of the locking sleeve retaining pin 110 with locking recesses 94, thereby preventing or considerably inhibiting rotation of the locking sleeve 82 about the locking assembly portion 78 of the second pole section 18. In various implementations, the biasing force of the biasing device 86 exerted on the locking sleeve collar 90 when the locking sleeve assembly 74 is in the 'Locked' position is approximately 2 lbs/in to 10 lbs/in, e.g., 4 lbs/in.

In various embodiments, the locking nut neck portion 72 includes a pair of opposing external flat sides 98 extending the length of the neck portion 72 and the locking sleeve 82 includes a pair of flat lips 100 extending radially inward along a proximal end 102 of the locking sleeve 82. The flat lips 100 are alignable and cooperative with the external flat sides 98 of the locking nut neck portion 82. Thus, the cooperation of the flat lips 100 with the flat sides 98 allow the locking sleeve 82 to be longitudinally transitioned along the locking nut neck portion 72 while simultaneously preventing rotation of the locking nut 34 within the locking sleeve 82. More particularly, cooperation of the flat lips 100 with the flat sides 98 and engagement of the locking recesses 94 with the locking pin 110, when the locking assembly 74 is in the 'Locked' position, prevents or considerably inhibits rotation of the locking nut 34 about the threads 38, thereby preventing or considerably inhibits separation of the male and female end portions 30 and 26.

As best illustrated in FIG. 3C, in various embodiments the locking nut neck portion 82 additionally includes a pair of undercuts 104 at a base 106 of the neck portion 82. The undercuts 104 are sized to receive the locking sleeve internal flat lips 100 and to allow partial rotation of the locking sleeve 82 about the locking sleeve neck portion 72. Thus, with the flat lips 100 aligned and cooperative with the external flat sides 98, the locking sleeve 82 can be transitioned along the locking sleeve neck portion 72 in the X⁻ direction, thereby compressing the biasing device 86. When the flat lips 100 align with the undercuts 104, the locking sleeve 82 can be partially rotated about the locking nut neck portion 72 to engage, or lock, the locking sleeve 82 with, or to, the locking nut 34 and place the locking sleeve in the 'Unlocked' position, as shown in FIG. 4B. When in the 'Unlocked' position, the locking recesses 94 are maintained in disengagement with the locking sleeve retaining pin 110 such that the locking nut 34 and the locking sleeve 82 can be rotated about the male end portion 30, i.e., about the threads 38, to allow disengagement of the male and female end portions 30 and 26, i.e., disconnection of the first and second pole sections 14 and 18.

Referring now to FIGS. 2, 3A, 3B, 3C, 4A and 4B, to place the locking sleeve 82 in the 'Locked' position, the locking nut 34 engaged with the locking sleeve 82, via engagement of the flat lips 100 with the undercuts 104, as described above, is rotated about the threads 38 to transition the locking nut 34 and the locking sleeve 82 in the X⁻ direction to securely couple the first and second pole sections 14 and 18 together, as described above. The locking sleeve 82 is then rotated about the locking nut neck portion 72 to disengage the locking sleeve flat lips 100 from the undercuts 104, thereby aligning the flat lips 100 with the flat sides 98 of the locking nut neck portion 72. Once the flat lips 100 are aligned and cooperative with the flat sides 98, the biasing device forces the locking sleeve to transition along the locking nut neck portion 72 in the X⁺ direction such that an opposing pair of the locking recesses 94 engage the locking pin ends 110A and 110B.

The force exerted by the biasing device on the locking sleeve 82 substantially maintains the locking pin ends 110A and 110B within the locking recesses 94 such that the locking sleeve 82 is prohibited or considerable inhibited from rotating about the locking sleeve assembly portion 78 of the second pole section 18. Moreover, when the locking sleeve 82 is prohibited or considerably inhibited from rotating about the locking sleeve assembly portion 78 of the second pole section 18 the cooperative relationship between the flat lips 100 and the flat sides 98 prohibit or considerably inhibit rotation of the locking nut about the threads 38. Accordingly, separation of the male and female end portions 30 and 26 82, i.e., separation of the first and second pole sections 14 and 18, is prohibited or considerably inhibited.

To place the locking sleeve assembly 74 in the 'Unlocked' position, a force is applied to the locking sleeve 82 in the X⁻ direction sufficient to overcome and compress the biasing force applied to the locking sleeve 82 by the biasing device 86. The locking sleeve 82 is then transitioned in X⁻ direction until the locking sleeve flat lips 100 align with the locking nut neck portion undercuts 104. The locking sleeve 82 can then be partially rotated about the locking nut neck portion 72 to engage the flat lips 100 with the undercuts 104 and thereby maintain the locking sleeve 82 engaged with the locking nut 34 in the 'Unlocked' position. With the locking sleeve 82 and locking nut 34 in the 'Unlocked' position, the locking nut can be rotated about the threads 38 to longitudinally transition the engaged locking nut 34 and locking sleeve 82 in the X⁺ direction to allow the connecting pin 42 to be removed from the J-shaped connecting slots 50. The male and female end portions 30 and 26, i.e., the first and second pole sections 14 and 18, can then be disconnected.

Figure 5:
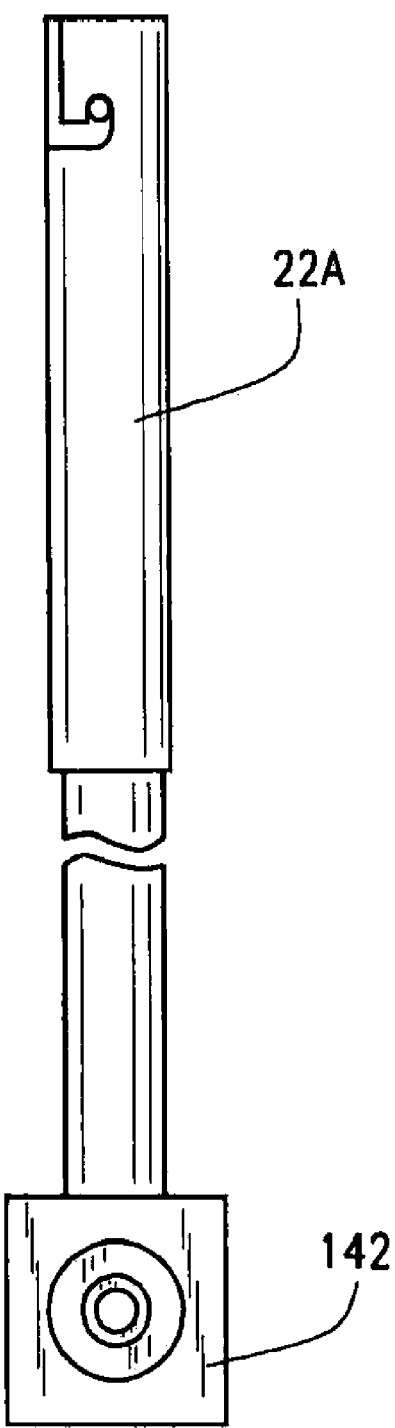
FIG. 5 is an illustration of a portion of the sectional handling pole shown in FIG. 1, having a tool connected thereto utilizing the coupling system shown in FIG. 1, in accordance with various embodiments of the present disclosure.

Referring now to FIG. 5, it should be understood that although the coupling system 22 has been described herein as being structured and operable to connect two or more pole sections, e.g., the first and second pole sections 14 and 18, the couple system 22 can further be implemented to connect a tool 142 to any pole section. More particularly, the tool 142 can be connected to a tubular female end portion 26A that is identical in form, structure and function as the tubular female end portion 26 described above. Accordingly, the tool 142 can be coupled to the male end portion 30 of any pole section utilizing the coupling system 22 as described above with regard to the first and second pole sections 14 and 18. The tool 142 can be any tool, instrument or device for performing a desired task utilizing the handling pole 10 having pole sections coupled together and/or tools coupled to a pole section utilizing the coupling system 22 described herein.

It will be understood that, although the terms first, second, third, etc., may be used herein to describe various elements, components and/or sections, these elements, components and/or sections should not be limited by these terms. These terms may be only used to distinguish one element, component or section from another element, component or section. Thus, a first element, component or section discussed below could be termed a second element, component or section without departing from the teachings of the example embodiments.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A coupling system comprising:
a first pole section having a tubular female end portion including a pair of opposing substantially J-shaped connecting slots, each J-shaped connecting slot having a backbone section open at a distal end of the female end portion; a second pole section having a first pin extending through a male end portion of the second pole section, and a second pin extending through a locking assembly portion of the second pole, and external threads between the first and second pins; a cylindrical locking nut including an internally threaded body portion and a neck portion with a pair of opposing external flat sides extending a length of the neck portion; a locking sleeve having an internal cavity with internal flat lips and a plurality of locking recesses along a distal end of the locking sleeve, wherein the coupling system is selectively assembled with the J-shaped slots receiving the first pin to rotationally fix the first pole section within the second pole section, the body portion threaded onto the external threads such that the body portion abuts against the female end portion to axially fix the first pole section within the second pole section, the external flat sides received within the flat lips to rotationally fix the nut within the sleeve, and a biasing member being received within the sleeve to bias the sleeve axially away from the nut such that the recesses are biased against the second pin to resist rotation of the sleeve relative to the second pin, and the coupling system is selectively disassembled when the sleeve is forced away from the second pin toward the nut to compress the biasing member and allow for unthreading of the body portion and removal of the first pin from the J-shaped connecting slots.

2. The coupling system of claim 1, wherein the biasing member is a spring.

3. The coupling system of claim 1, wherein an outer diameter of the male end portion is substantially equal to an inner diameter of the female end portion.

4. The coupling system of claim 1, wherein the first pin extends laterally through the male end portion between the external threads and a distal end of the male end portion.

5. The coupling system of claim 1, wherein an outer diameter of the neck portion is smaller than an outer diameter of the body portion.

6. The coupling system of claim 1, wherein the locking sleeve includes an internal collar configured to engage the biasing member.

7. The coupling system of claim 1, wherein the first pole section is configured to connect to a tool.

8. The coupling system of claim 1, wherein the J-shaped connecting slots include a hook section configured to engage the first pin.

9. The coupling system of claim 1, wherein the biasing member is a coil spring having an outside diameter substantially equal to an inside diameter of the locking sleeve.

* * * * *

UNITED STATES PATENT AND TRADEMARK OFFICE
CERTIFICATE OF CORRECTION

| | | |
|---|---|---|
| PATENT NO. | : 8,007,196 B2 | Page 1 of 1 |
| APPLICATION NO. | : 12/056738 | |
| DATED | : August 30, 2011 | |
| INVENTOR(S) | : Robert Whitling, Gregory Francisco and William Dale Jones | |

It is certified that error appears in the above-identified patent and that said Letters Patent is hereby corrected as shown below:

Col. 7, Lines 1-14, should read as follows:

--[0036] The force exerted by the biasing device on the locking sleeve 82 substantially maintains the locking pin ends 110A and 110B within the locking recesses 94 such that the locking sleeve 82 is prohibited or considerably inhibited from rotating about the locking sleeve assembly portion 78 of the second pole section 18. Moreover, when the locking sleeve 82 is prohibited or considerably inhibited from rotating about the locking sleeve assembly portion 78 of the second pole section 18 the cooperative relationship between the flat lips 100 and the flat sides 98 prohibit or considerably inhibit rotation of the locking nut about the threads 38. Accordingly, separation of the male and female end portions 30 and 26 [[82]], i.e., separation of the first and second pole sections 14 and 18, is prohibited or considerably inhibited.--.

Signed and Sealed this
Twentieth Day of March, 2012

David J. Kappos
*Director of the United States Patent and Trademark Office*